(12) United States Patent
Simon

(10) Patent No.: US 11,632,350 B2
(45) Date of Patent: Apr. 18, 2023

(54) METHODS FOR MANAGING SHARING AND FOR SHARING MESSAGES, MESSAGING DEVICES OF DISTINCT TYPES IMPLEMENTING SAME

(71) Applicant: ORANGE, Issy-les-Moulineaux (FR)

(72) Inventor: Pierre-Henri Simon, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/690,969

(22) Filed: Nov. 21, 2019

(65) Prior Publication Data
US 2020/0169526 A1    May 28, 2020

(30) Foreign Application Priority Data

Nov. 22, 2018  (FR) ........................ 1872370

(51) Int. Cl.
*G06F 15/16*    (2006.01)
*H04L 51/56*    (2022.01)

(52) U.S. Cl.
CPC .................... *H04L 51/56* (2022.05)

(58) Field of Classification Search
CPC ............ H04L 51/36; H04W 4/14; H04W 4/21
See application file for complete search history.

(56) References Cited

U.S. PATENT DOCUMENTS

| 7,181,231 B2 | 2/2007 | Bodie et al. | |
| 10,025,475 B1* | 7/2018 | Cohen | ............... H04L 51/18 |
| 2006/0053227 A1* | 3/2006 | Ye | ............... H04W 4/18 |
| | | | 709/230 |
| 2007/0022213 A1* | 1/2007 | Fahmy | ............... H04L 51/04 |
| | | | 709/246 |
| 2020/0120051 A1* | 4/2020 | Cohen | ............... H04L 51/14 |

FOREIGN PATENT DOCUMENTS

| EP | 1289322 A1 | 3/2003 |
| EP | 1536607 A1 | 6/2005 |
| EP | 1775971 A1 | 4/2007 |
| GB | 2412272 A | 9/2005 |

OTHER PUBLICATIONS

English translation of the Written Opinion dated Jul. 17, 2019 for corresponding French Application No. 1872370, filed Nov. 22, 2018.
French Search Report and Written Opinion dated Jul. 17, 2019 for corresponding French Application No. 1872370, filed Nov. 22, 2018.
Machine translation of the European Office Action dated Jan. 20, 2022 for corresponding EP Application No. 192101038.

* cited by examiner

*Primary Examiner* — Yves Dalencourt
(74) *Attorney, Agent, or Firm* — David D. Brush; Westman, Champlin & Koehler, P.A.

(57) ABSTRACT

A method and apparatus for managing sharing of a message of a first type through a communication network. The method includes, following selection of a sharing command from an interface for reproducing the first message of the first type, integrating content of the first message of the first type into a second message of a second type to be transmitted through the communication network, the second type being distinct from the first type. Thus, a message of a first type can be shared by using a messaging of a distinct type, for example an email can be shared by SMS, MMS, instant messages, Tweet (registered trademark), etc.

11 Claims, 4 Drawing Sheets

[Fig 1]
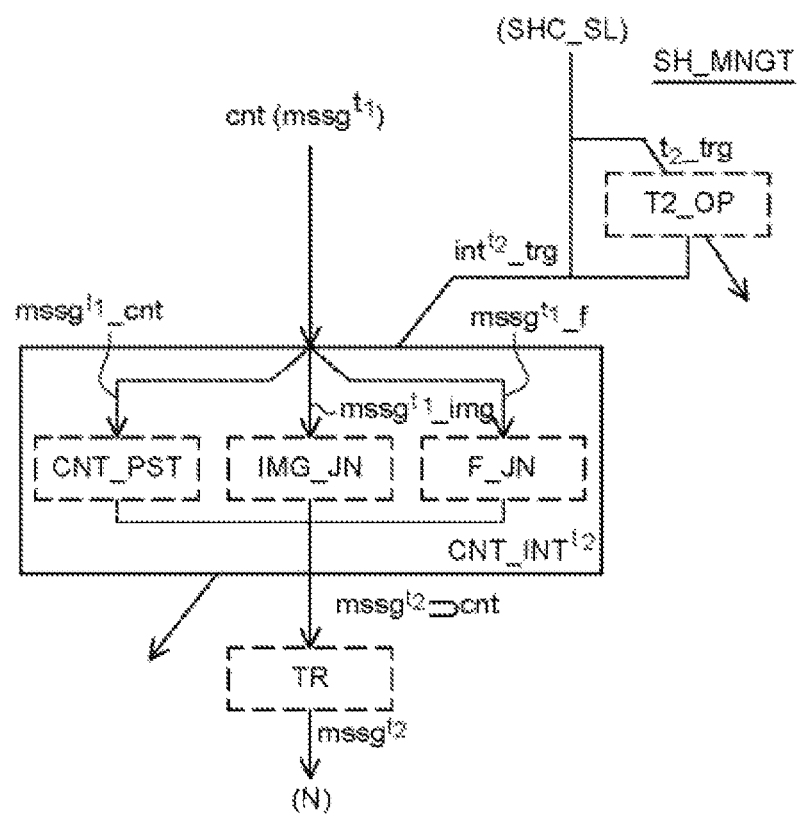

[Fig 2]
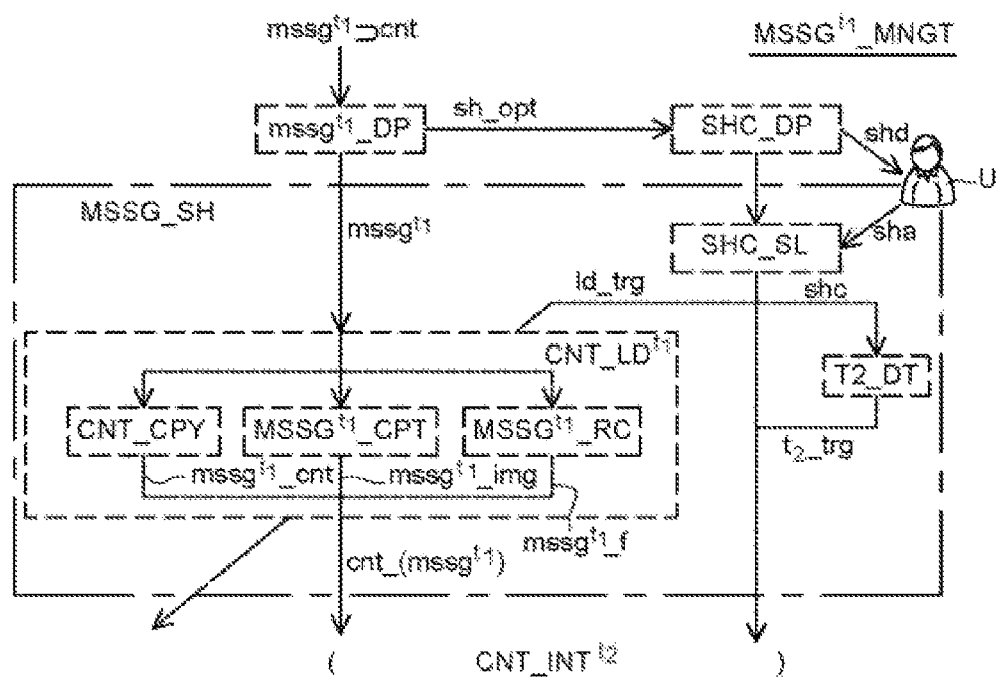
[Fig 4]
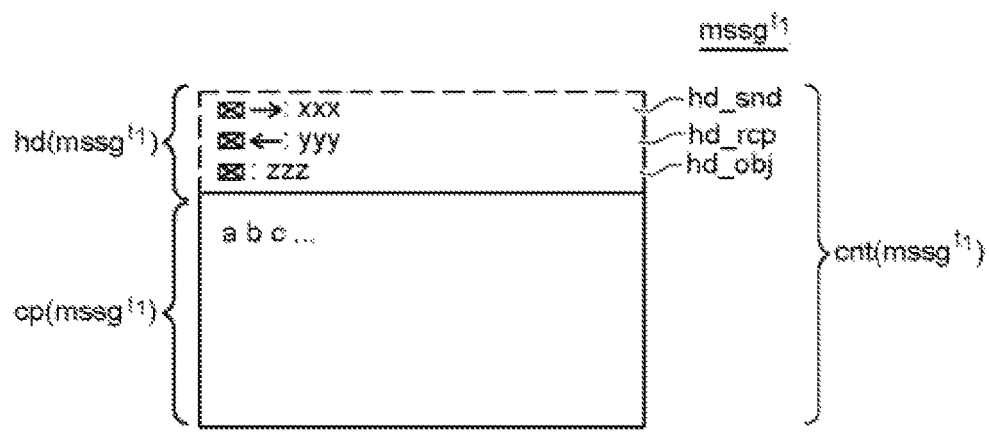

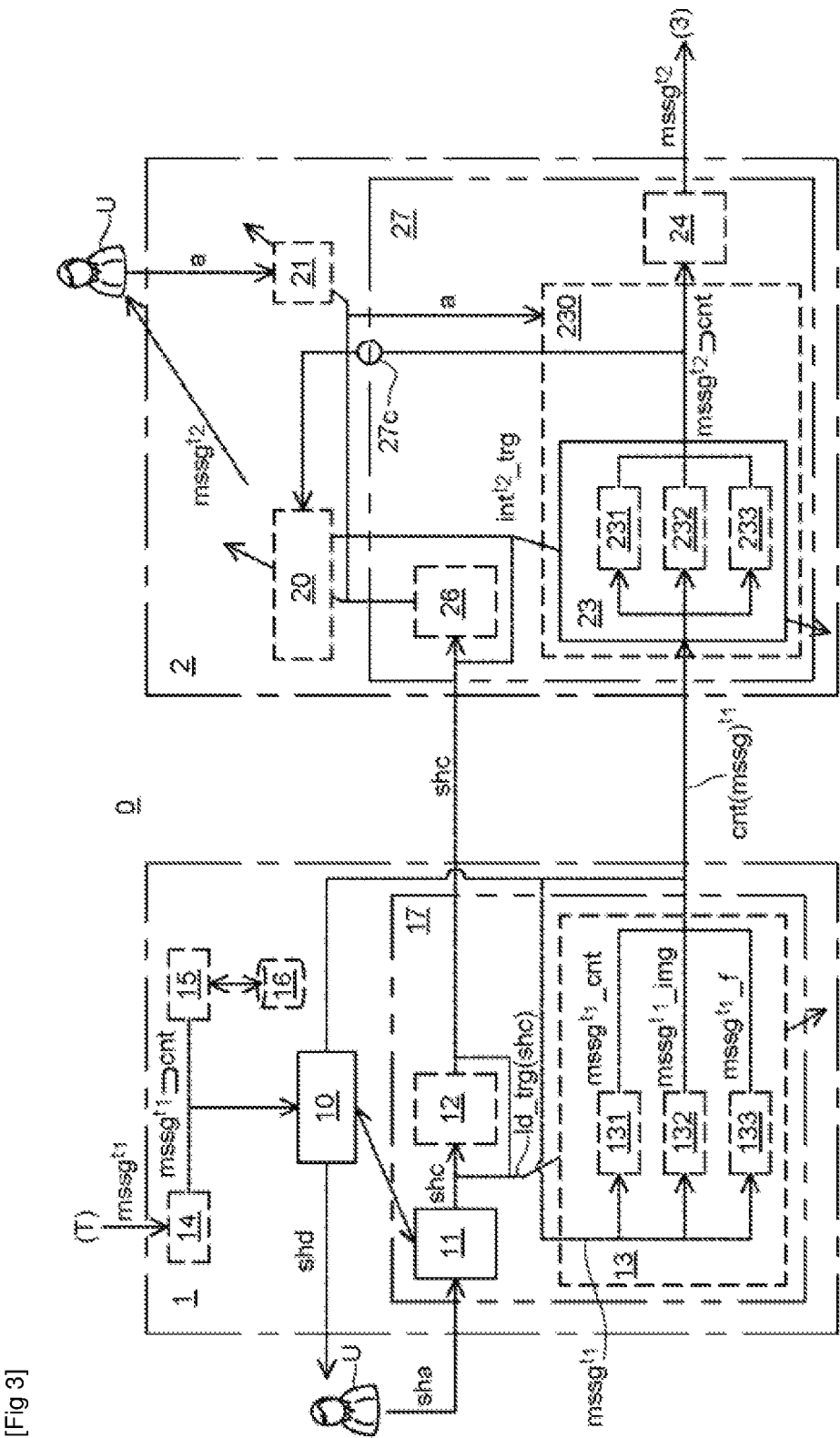
[Fig 3]

[Fig 5a]
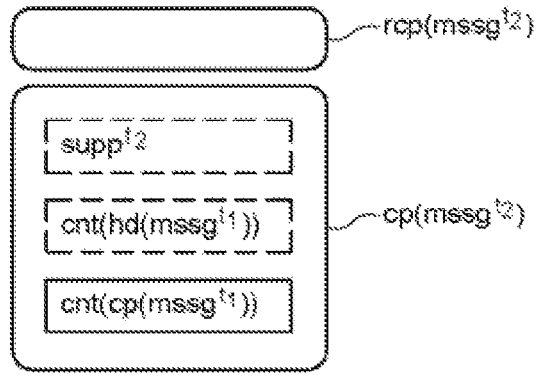
[Fig 5b]
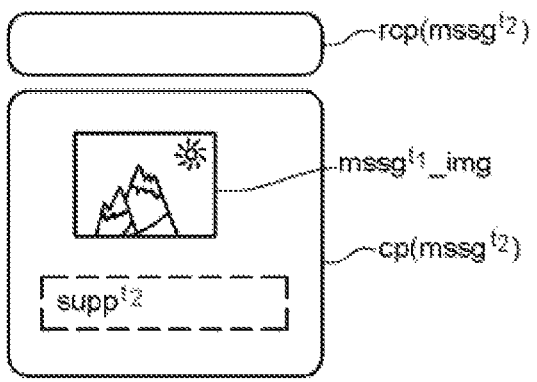
[Fig 5c]
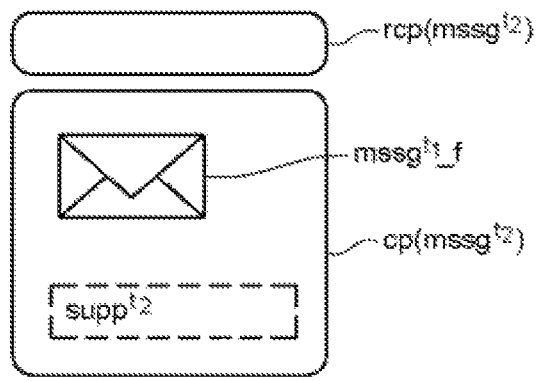

METHODS FOR MANAGING SHARING AND FOR SHARING MESSAGES, MESSAGING DEVICES OF DISTINCT TYPES IMPLEMENTING SAME

TECHNICAL FIELD

The invention relates to the sharing of a message via a communication network by another messaging means, for example the sharing of email by SMS or Tweets.

PRIOR ART

There are these days two types of data sharing via a communication network: either the user gives rights of access to files stored on his or her local area network or a server to one or more recipients, or the user distributes the shared data via the communication network to the recipient(s).

The sharing by access authorization notably on a dedicated server such as on the Cloud is the type of sharing which makes it possible to provide access to the widest variety of data to these recipients: images, videos, spreadsheets, text, etc.

This type of sharing has not been configured to share exchanges. Possibly, it is also possible to give access to these exchanges by email, SMS, MMS, Tweet when they are saved on such servers. However, in the case of the exchanges, the sharing requires the prior saving of the exchanges before they can be shared. That leads to an overloading both of the communication networks during the saving and of the backup memory of the servers sharing exchanges which will perhaps never be shared.

On a website, a social network page, a gallery of images and/or of videos, there is generally available at least a sharing icon which makes it possible to order the sharing respectively of the address of the website or of the social network page, of an image, of a video. Possibly, the user can choose between multiple sharing modes, by email but also via SMS, MMS or social networks such as Twitter, Facebook (registered trademarks), etc. Thus, the user can easily share addresses or multimedia contents between multiple applications: send a photo by SMS, on Twitter, by email, etc. This sharing function is very widely used, notably on the social networks.

Nevertheless, this type of sharing still does not allow everything to be shared. In particular, it is not possible to share exchanges such as a message, notably an email, via another messaging system, for example by SMS or Tweet, because it is impossible to exit from the email application.

However, such sharing is of interest because it makes it possible to transfer a message to a person who does not have an email address for example or who is not connected (no mobile Internet subscription for example, messaging not installed on mobile or no Internet coverage).

SUMMARY OF THE INVENTION

One aim of the present invention is to remedy the drawbacks of the prior art.

One object of the invention is a method for managing sharing of a message of a first type through a communication network comprising, following a selection of a sharing command from an interface for reproducing the first message of the first type, an integration of the content of the first message of the first type into a second message of a second type to be transmitted through the communication network, the second type being distinct from the first type.

Thus, a message of a first type can be shared by using a messaging of a distinct type, for example an email can be shared by SMS, MMS, instant messages, Tweet (registered trademark), etc.

Advantageously, the sharing management method comprises an opening of an interface for inputting the second message of the second type following the selection of a sharing command from an interface for reproducing the first message of the first type and prior to the integration.

Thus, the first message shared by using a messaging of a second type can possibly be complemented and/or modified by a user as in a simple transfer of email or a photosharing.

Advantageously, the integration comprises a pasting of a text (possibly including associated hypertext links) corresponding to a copy of the content of the first message triggered by the selection.

Thus, the recipient has access to the text of the first shared message in the second message, notably to copy it and/or modify it.

Advantageously, the integration comprises an insertion of an image of the content of the first message triggered by the selection.

Thus, the first message can be shared via messages of second type that do not accept text or accept only short texts and photos.

Advantageously, the integration comprises an insertion of a message file of the content of the first message triggered by the selection.

Thus, the recipient of the second message can re-open the first message in this second message with a messaging device of the first type notably to continue the conversation via this first type of messaging when the recipient is once again connected to the ad-hoc communication network. For example, the second message of MMS type comprises the first message which is an email in the form of a ".msg" file. Thus, the recipient can open and/or import the ".msg" file with a messaging device of email type, such as Outlook (registered trademark) or an operator or service provider messaging. That allows him or her to import and/or store the first message which has been transferred to him or her by means of the second message in this messaging device of email type and/or, possibly, continue the conversation by email.

Advantageously, the content of the first message comprises a header of the message of the first type.

Thus, the recipient of the second message receives not only the body of the first message but also the information concerning the sender, the recipient(s), the date of sending and/or the object of the first message notably facilitating the continuation of the conversation whatever the type of messaging used: first or second type.

Another object of the invention is a method for sharing a message of a first type through a communication network comprising a selection of a sharing command from an interface for preproducing the first message of the first type, the sharing command triggering an integration of the content of the first message of the first type into a second message of a second type to be transmitted through the communication network, the second type being distinct from the first type.

Advantageously, the sharing method comprises a determination of an interface for inputting a message of the second type as a function of the selected sharing command.

Thus, the sender of the second message can choose the type of messaging used for the sharing of the first message between multiple messaging devices available on the terminal of the sender of the second message.

One object of the invention is also a method for managing messages of a first type comprising a reproduction of a first message of the first type, and a reproduction of an interface for selecting a sharing command from an interface for reproducing the first message of the first type, the sharing command triggering an integration of the content of the first message of the first type into a second message of a second type to be transmitted through the communication network, the second type being distinct from the first type.

Advantageously, according to one implementation of the invention the different steps of the method according to the invention are implemented by software or a computer program, this software comprising software instructions intended to be executed by a data processor of a device forming part of a messaging device and/or of a sharing management device and being designed to order the execution of the different steps of this method.

The invention therefore also targets a program comprising program code instructions for the execution of the steps of the sharing management method as claimed in any one of claims 1 to 6 and/or the sharing method as claimed in claim 7 and/or the method for managing messages of the first type as claimed in claim 8 when said program is executed by a processor.

This program can use any programming language and be in the form of source code, object code or intermediate code between source code and object code, as in a partially compiled form or in any other desirable form.

One object of the invention is also a distributor of messages of a first type through a communication network comprising an interface for selecting a sharing command from the interface for reproducing the first message of the first type, the sharing command triggering an integrator of the content of the first message of the first type in a second message of a second type to be transmitted through the communication network, the second type being distinct from the first type.

One object of the invention is also a first messaging device of a first type comprising an interface for reproducing a first message of the first type, and an interface for selecting a sharing command from the interface for reproducing the first message of the first type, the sharing command triggering an integrator of the content of the first message of the first type in a second message of a second type to be transmitted through the communication network, the second type being distinct from the first type.

Advantageously, the first messaging device is of the electronic messaging type.

One object of the invention is also a manager of sharing of messages of a second type comprising an integrator of the content of a first message of the first type available in a first messaging device of the first type into a second message of a second type to be transmitted through the communication network following a selection of a sharing command from an interface for reproducing the first message of the first type of the first messaging device, the second type being distinct from the first type.

One object of the invention is, also, a second messaging device of a second type comprising an interface for inputting a second message to be transmitted, an interface for reproducing the second message to be transmitted, and a connection with an integrator making it possible to integrate the content of a first message of the first type available in a first messaging device of the first type into the second message of the second type to be transmitted through the communication network following a selection of a sharing command from an interface for reproducing the first message of the first type of the first messaging device, the second type being distinct from the first type.

Advantageously, the second messaging device is one of the types out of the following:

messaging for mobile short messages, messaging for mobile multimedia messages, messages for IP short instant messages.

BRIEF DESCRIPTION OF THE DRAWINGS

The features and advantages of the invention will become more clearly apparent on reading the description, given by way of example, and the figures relating thereto which represent:

FIG. 1, a simplified diagram of the sharing management method according to the invention;

FIG. 2, a simplified diagram of the methods for sharing and managing messages of a first type according to the invention;

FIG. 3, simplified diagrams of a distributor of messages, of a first messaging device of a first type, of a sharing manager, of a second messaging device of a second type according to the invention, and of an architecture implementing them according to the invention;

FIG. 4, a simplified diagram of an example of a message of a first type according to the invention;

FIG. 5a, a simplified diagram of messages of the second type integrating the content of a message of a first type distinct from the second type, in the form of a copy of the content of the message of the first type according to the invention.

FIG. 5b, a simplified diagram of messages of the second type integrating the content of a message of a first type distinct from the second type in the form of an image of the content of the message of the first type according to the invention.

FIG. 5c, a simplified diagram of messages of the second type integrating the content of a message of a first type distinct from the second type in the form of a file of the message of the first type according to the invention.

DESCRIPTION OF EMBODIMENTS

FIG. 1 illustrates a simplified diagram of a sharing management method according to the invention.

The sharing management method SH_MNGT for a message of a first type $mssg^{t1}$ through a communication network N comprises, following a selection of a sharing command SHC_SL from an interface for reproducing the first message of the first type, an integration of the content of the first message of the first type $CNT\_INT^{t2}$ into a second message of a second type $mssg^{t2}$ to be transmitted through the communication network N. The second type t2 is distinct from the first type t1.

In particular, the integration $CNT\_INT^{t2}$ is triggered $int^{t2}\_trg$ by the selection of a sharing command SHC_SL.

In particular, the sharing management method SH_MNGT comprises an opening of an interface for inputting the second message of the second type T2_OP following the selection of a sharing command SHC_SL from an interface for reproducing the first message of the first type and prior to the integration CNT_INT$^{t2}$.

In particular, the integration CNT_INT$^{t2}$ is triggered int$^{t2}$_trg by the opening of the input interface T2_OP, itself triggered t2_trg by the selection of a sharing command SHC_SL.

In particular, the integration CNT_INT$^{t2}$ comprises a pasting CNT_PST of a text corresponding to a copy of the content of the first message mssg$^{t1}$_cnt triggered by the selection SHC_SL.

In particular, the integration CNT_INT$^{t2}$ comprises an insertion of an image IMG_JN of the content of the first message mssg$^{t1}$_img triggered by the selection SHC_SL.

In particular, the integration CNT_INT$^{t2}$ comprises an insertion of a message file F_JN of the content of the first message mssg$^{t1}$_f triggered by the selection SHC_SL.

In a particular embodiment, the selection of a sharing command SHC_SL triggers the generation of a second message of the second type mssg$^{t2}$. The second message of the second type mssg$^{t2}$ thus generated comprises the content of the first message of the first type cnt(mssg$^{t1}$): mssg$^{t2}$ ⊃ cnt. This second message of the second type mssg$^{t2}$ is possibly reproduced allowing the user to complement the content of the first message of the first type cnt(mssg$^{t1}$) which has been integrated therein with other data: text, image, video, etc. input, selected, respectively, in a clipboard or in a directory of images, videos, etc. or captured by voice recognition, manuscripts, a camera, etc.

A message management method MSSG$^{t2}$_MNGT (not illustrated) for messages of the second type mssg$^{t2}$ comprises a reproduction (not illustrated) of a message of the second type.

In particular, the method for managing messages of the second type MSSG$^{t2}$_MNGT comprises notably an insertion of data D_JN in the second message of the second type mssg$^{t2}$. Notably, the data comprise data captured and/or data input on a terminal implementing the method for managing messages of the second type MSSG$^{t2}$_MNGT.

In particular, the method for managing messages of the second type MSSG$^{t2}$_MNGT comprises the sharing management method illustrated by FIG. 1. The insertion of data D_JN into a second message of the second type mssg$^{t2}$ comprises, for example, the integration of the content CNT_INT$^{t2}$ of the first message of the first type mssg$^{t1}$.

In particular, the method for managing messages of the second type MSSG$^{t2}$_MNGT comprises a sending of the second message of the second type mssg$^{t2}$ integrating the content of the first message of the first type cnt(mssg$^{t1}$) through the communication network N to a user.

For example, if the first message is of email type, the content cnt(mssg$^{t1}$) of this email, that is to say of the first message, is integrated into a second message mssg$^{t2}$, notably of SMS, MMS or Tweet type for example, thus making it possible to transmit to a user not having access to the emails (problem of access to the email server or no email account) the content of the first message via another messaging, for example by SMS or MMS.

In particular, the sender can, in the integration interface, choose to retain or to delete the header data (and/or signature data) before sending (for example in the case of sending to a short-format SMS messaging if the message includes a long list of recipients, etc.).

FIG. 2 illustrates a simplified diagram of the methods for managing sharing and for managing messages of a first type according to the invention.

The method for sharing a message of a first type MSSG_SH through a communication network N comprises a selection of a sharing command SHC_SL from an interface for reproducing the first message of the first type mssg$^{t1}$. The sharing command shc triggers an integration of the content of the first message of the first type into a second message of a second type CNT_INT$^{t2}$ to be transmitted through the communication network N. The second type t2 is distinct from the first type t1.

Notably, a user U indicates, by means of an action sha via an input interface (keyboard input, mouse selection, stylus, touch, gesture, gesture capture, etc.), the sharing command shc that he or she selects.

In particular, the selection of a sharing command SHC_SL triggers t2_trg the integration CNT_INT$^{t2}$.

In particular, the sharing method MSSG_SH comprises a determination of an interface for inputting a message of the second type T2_DT as a function of the selected sharing command shc. For example, the input interface is determined from among several messaging devices available on the terminal implementing the sharing method and/or accessible from this terminal.

In particular, the determination of the interface for inputting the message of the second type T2_DT triggers t2_trg the integration CNT_INT$^{t2}$.

In particular, the sharing method MSSG_SH comprises a loading of the content of the first message of the first type CNT_LD$^{t1}$ following the selection of a sharing command SHC_SL. Notably, the loading of the content of the first message of the first type CNT_LD$^{t1}$ is triggered either directly by the selection of a sharing command SHC_SL, or by the determination T2_DT.

In particular, the loading CNT_LD$^{t1}$ comprises a copy CNT_CPY of the content of the first message mssg$^{t1}$_cnt following the selection SHC_SL.

In particular, the loading CNT_LD$^{t1}$ comprises a capture MSSG$^{t1}$_CPT of the content of the first message mssg$^{t1}$_img notably in the form of an image mssg$^{t1}$_img following the selection SHC_SL.

In particular, the loading CNT_LD$^{t1}$ comprises the recording MSSG$^{t1}$_RC in a message file mssg$^{t1}$_f of the content of the first message following the selection SHC_SL.

FIG. 2 also illustrates a method for managing messages MSSG$^{t1}$_MNGT of a first type mssg$^{t1}$.

This method for managing messages MSSG$^{t1}$_MNGT of a first type comprises
- a reproduction MSSG$^{t1}$_DP of a first message of the first type mssg$^{t1}$, and
- a reproduction of a sharing command selection interface SHC_DP from an interface for reproducing the first message of the first type.

The sharing command shc triggers an integration of the content of the first message of the first type into a second message of a second type CNT_INT$^{t2}$ to be transmitted through the communication network N. The second type t2 is distinct from the first type t1.

In particular, the method for managing messages of the first type MSSG$^{t1}$_MNGT comprises the sharing method illustrated by FIG. 2.

In particular, the reproduction of a sharing command selection interface SHC_DP broadcasts to the user U a signal indicating the available sharing commands shd. This signal of reproduction of the sharing commands available shd is notably an image, a video, an audio signal, etc.

Notably, the reproduction of a first message of the first type MSSG$^{t1}$_DP triggers sh_opt the reproduction of a sharing command selection interface SHC_DP notably in the form of one or more displayed buttons corresponding either each to a sharing mode: Tweet, SMS, MMS, etc. if the first type is an email, or email, Tweet, if the first mode is an SMS, etc., or an access to a sharing mode menu; or in the form of a sharing mode menu, etc.

In a particular embodiment, a program comprises program code instructions for executing the steps of the sharing management method, and/or of the method for managing messages of the second type and/or of the sharing method and/or of the method for managing messages of the first type when said program is executed by a processor.

FIG. 3 illustrates simplified diagrams of a sharing manager, of a first messaging device of a first type, of a message distributor, of a second messaging device of a second type according to the invention, and of an architecture implementing them according to the invention.

A message distributor of a first type 17 through a communication network 3 comprises an interface for selecting a sharing command 11 from the interface for reproducing the first message of the first type 10. The sharing command shc triggers an integrator 23 of the content of the first message of the first type cnt(mssg$^{t1}$) into a second message of a second type mssg$^{t2}$ to be transmitted through the communication network 3. The second type t2 is distinct from the first type t1.

Notably, a user U indicates by means of an action sha via an input interface 11 (keyboard input, mouse selection, stylus, touch, gesture, gesture capture, etc.) the sharing command shc that he or she selects.

In particular, the interface for selecting a sharing command 11 directly triggers t2_trg the integrator 23.

In particular, the distributor of messages of the first type 17 comprises an analyzer 12 that makes it possible to determine an interface for inputting a message of the second type as a function of the sharing command selected shc. For example, the input interface is determined from among several messaging devices available on the terminal 0 implementing the sharing manager 17 and/or accessible from this terminal 0.

In particular, the analyzer 12 determining the interface for inputting the message of the second type triggers t2_trg the integrator 23.

In particular, the distributor of messages of the first type 17 comprises a loader 13 of the content of the first message of the first type following the selection of a sharing command by means of the selection interface 11. Notably, the loader 13 of the content of the first message of the first type is triggered either directly by the selection interface 11 for selecting a sharing command, or by the analyzer 12.

In particular, the loader 13 comprises a recorder 131 of the content of the first message mssg$^{t1}$_cnt in a temporary memory, such as a clipboard, following the selection by the selection interface 11.

In particular, the loader 13 comprises a sensor 132 of the content of the first message mssg$^{t1}$_img, notably in the form of an image mssg$^{t1}$_img following the selection by the selection interface 11.

In particular, the loader 13 comprises a recorder 133 in a message file mssg$^{t1}$_f of the content of the first message following the selection by the selection interface 11.

A first messaging device of a first type 1 comprises:
an interface 10 for reproducing a first message of the first type mssg$^{t1}$, and
an interface for selecting a sharing command 11 from the interface 10 for reproducing the first message of the first type. The sharing command she triggers an integrator 23 of the content of the first message of the first type cnt(mssg$^{t1}$) in a second message of a second type mssg$^{t2}$ to be transmitted through the communication network 3. The second type t2 is distinct from the first type t1.

In particular, the first messaging device 1 is of the electronic messaging type.

In particular, the first messaging device 1 comprises the distributor of messages of the first type 17.

In particular, the reproduction interface 10 makes it possible to broadcast to the user U the sharing command selection interface 11 by means of a signal indicating the available sharing commands shd. This signal of reproduction of the available sharing commands shd is notably an image, a video, an audio signal, etc.

Notably, the reproduction interface 10 triggers, upon the reproduction of a first message of the first type mssg$^{t1}$, the reproduction of the sharing command selection interface 11 notably in the form of one or more displayed buttons corresponding either each to a sharing mode: Tweet, SMS, MMS, etc. if the first type is an email, or email, Tweet, if the first mode is an SMS, etc., or to an access to a sharing mode menu; or in the form of a sharing mode menu, etc.

In particular, the first messaging device of a first type 1 comprises a receiver of messages of the first type 14 originating notably from a third-party terminal T and/or a reader 15 of messages of the first type in a base of messages of first type 16. A message of the first type read or received mssg$^{n}$ is reproduced by the reproduction interface 10. The user U of the terminal 0 implementing the first messaging device of the first type 1 selects a sharing mode sha for the first message reproduced mssg$^{t1}$ by means of the selection interface 11 which triggers the integrator 23 of the manager of sharing of messages of the first type 27.

In particular, the content of the message of the first type read or received cnt(mssg$^{t1}$) is integrated into a second message of a second type by means of the integrator 23. Thus, a terminal 0 implementing the manager 27 and comprising a sender of messages of the second type 24 is capable of sending the second message integrating the content of the first message mssg$^{t1}$ D cnt(mssg$^{t2}$) via a communication network 3.

A manager of sharing of messages of a second type 27 through a communication network 3 comprises an integrator 23 of the content of a first message of the first type cnt(mssg$^{t1}$), available in a first messaging device of the first type 1, into a second message of a second type mssg$^{t2}$ to be transmitted 2 through the communication network 3 following a selection of a sharing command from a reproduction interface 10 for the first message of the first type of the first messaging device 1. The second type t2 is distinct from the first type t1.

In particular, the integrator 23 is controlled int$^{t2}$_trg by a sharing command selection interface 11 (directly or indirectly), notably implemented in a first messaging device 1.

In particular, the manager of sharing of messages of the second type 27 comprises (not illustrated) an interface for inputting the second message of the second type 21, the opening of which is performed following the selection of a sharing command she from the interface for reproducing the first message of the first type 11 and prior to the triggering of the integrator 23.

In particular, the integrator 23 is triggered int$^{t2}$_trg by the opening of the input interface 21, itself triggered t2_trg by the interface for selecting a sharing command 11.

In particular, the manager of sharing of messages of the second type 27 comprises (not illustrated) a generator of messages of the second type 26 triggering the integrator 23 and/or the opening of an input interface 21.

In a particular embodiment, the generator 26 is notably triggered by the interface for selecting a sharing command 11. The second message of the second type $mssg^{t2}$ thus generated comprises the content of the first message of the first type $cnt(mssg^{t1})$: $mssg^{t2}$ D cnt. This second message of the second type $mssg^{t2}$ is possibly reproduced by a reproduction interface 20 allowing the user to complement, by means of an input interface 21, the content of the first message of the first type $cnt(mssg^{t1})$ which has been integrated therein with other data: text, image, video, etc. input, selected, respectively, in a clipboard or in a directory of images, videos, etc., or captured by voice recognition, manuscripts, camera, etc.

In particular, the integrator 23 comprises a recorder 231 that makes it possible to paste a text corresponding to a copy of the content of the first message $mssg^{t1}\_cnt$ triggered by the selection interface 11.

In particular, the integrator 23 comprises an image aggregator 232 that makes it possible to insert into the second message $mssg^{t2}$ an image of the content of the first message $mssg^{t1}\_img$ triggered by the selection interface 11.

In particular, the integrator 23 comprises a file aggregator 232 that makes it possible to insert into the second message $mssg^{t2}$ a message file of the content of the first message $mssg^{t1}\_f$ triggered by the selection interface 11.

A second messaging device of a second type 2 comprises:
an interface 20 for reproducing the second message to be transmitted $mssg^{t2}$, and
a connection 27c with an integrator 23 that makes it possible to integrate the content of a first message of the first type $cnt(mssg^{t1})$, available in a first messaging device of the first type 1, into the second message of the second type $mssg^{t2}$ to be transmitted through the communication network 3 following a selection of a sharing command from an interface 10 for reproducing the first message of the first type of the first messaging device 1. The second type t2 is distinct from the first type t1.

In particular, the second messaging device 2 comprises an interface 21 for inputting a second message to be transmitted.

In particular, the message sharing manager 27 is implemented outside of the second messaging device 2 and provides the second messaging device 2 with the second message $mssg^{t2}$ into which has been integrated the content of the first message $cnt(mssg^{t1})$. Alternatively, the second messaging device 2 comprises a distributor of messages of a second type 27.

In particular, the second messaging device 2 is one of the types out of the following:
messaging for mobile short messages,
messaging for mobile multimedia messages,
messaging for IP short instant messages.

In particular, the second messaging device of a second type 2 comprises notably an integrator of data 230 in the second message of the second type $mssg^{t2}$. Notably, the data comprise data captured and/or data input on an input interface 21 of the terminal 0 implementing the message manager 27.

In particular, the second messaging device of a second type 2 comprises the sharing manager 27 illustrated by FIG. 3. The aggregator of data 230 in a second message of the second type $mssg^{t2}$ comprises, for example, the integrator of the content 23 of the first message of the first type $mssg^{t1}$.

In particular, the second messaging device of a second type 2 comprises a sender 24 of the second message of the second type $mssg^{t2}$ integrating the content of the first message of the first type $cnt(mssg^{t1})$ through the communication network 3 to at least one user. The recipient user can be the user U of the terminal 0 using a terminal distinct from the terminal 0 and/or a user distinct from the user U using the terminal 0 or a terminal distinct from the terminal 0.

FIG. 4 illustrates a simplified diagram of an example of first message of a first type according to the invention.

The first message of the first type is notably of one of the following types:
email,
mobile short messages,
messaging for mobile multimedia messages,
messaging for IP short instant messages, etc.

The content of the first message of the first type cnt $(mssg^{t1})$ comprises at least the text of the body of the first message of the first type $cp(mssg^{t1})$ with or without its formatting, and possibly the image(s), spreadsheet(s), chart(s), etc. included in the body of the first message of the first type $cp(mssg^{t1})$, as appropriate.

In particular, the content of the first message of the first type $cnt(mssg^{t1})$ also comprises at least a part of the header of the first message of the first type $hd(mssg^{t1})$. The header of the first message of the first type $hd(mssg^{t1})$ comprises at least the recipient of the message hd_rcp. Possibly, the header of the first message of the first type $hd(mssg^{t1})$ also comprises the sender of the message hd_snd and/or the object of the message hd_obj.

FIGS. 5a to 5c illustrate simplified diagrams of messages of the second type integrating the content of a first message of a first type distinct from the second type.

The second message of the second type $mssg^{t2}$ comprises at least a body of the second message of the second type $cp(mssg^{t2})$ and a recipient of the second message of the second type $rcp(mssg^{t2})$. According to the invention, the body of the second message of the second type $cp(mssg^{t2})$ comprises, following the integration $CNT\_INT^{t2}$ (illustrated notably by FIG. 1), the content of the first message of the first type $cnt(mssg^{t1})$.

In particular, the body of the second message of the second type $cp(mssg^{t2})$ also comprises additional data $supp^{t2}$ such as data input, captured, etc. by the user of the terminal implementing the method for managing messages of the second type.

Thus, the user can complement the content of the first message of the first type included automatically in the second message of the second type with additional data $supp^{t2}$ in the form of text, image, charts, spreadsheets, videos, etc. That allows the user to transfer the content of the first message of the first type not by means of another message of the first type as is conventionally done by the transfer function, also called "forward", for the email or the SMSs, but by means of a second message of a second type distinct from the first type.

FIG. 5a illustrates an integration of the content of a first message of a first type distinct from the second type in the form of a copy of the content of the first message of the first type, according to the invention.

In the case where the integration is performed by pasting the content CNT_PST as illustrated by FIG. 1, the body of the second message of the second type $cp(mssg^{t2})$ comprises, following the integration $CNT\_INT^{t2}$, at least the content of the body of the first message of the first type $cnt(cp(mssg^{t1}))$, notably as illustrated by FIG. 4. Content of the body is understood to mean at the text of the body of this first message of the first type, and possibly the image(s), spreadsheet(s), chart(s), etc. included in the body of this first message of the first type cp(mssg$^{t1}$), as appropriate.

In particular, the body of the second message of the second type cp(mssg$^{t2}$) also comprises, following the integration CNT_INT$^{t2}$, the content of at least a part of the header of the first message of the first type cnt(hd(mssg$^{t1}$)), that is to say the recipient of the message hd_rcp, and/or the sender of the message hd_snd and/or the object of the message hd_obj.

FIG. 5b illustrates an integration of the content of a first message of a first type distinct from the second type in the form of an image of the content of the first message of the first type according to the invention.

In the case where the integration is done by insertion of an image of the first message IMG_JN as illustrated by FIG. 1, the body of the second message of the second type cp(mssg$^{t2}$) comprises, following the integration CNT_INT$^{t2}$, an image of the first message of the first type mssg$^{t1}$_img.

The image of the first message of the first type comprises notably a photograph of the content of the first message of the first type, in particular of the body of the content. The content of the body is understood to mean at least the text of the body of this first message of the first type, and possibly the image(s), spreadsheet(s), chart(s), etc. included in the body of this first message of the first type cp(mssg$^{t1}$), as appropriate.

In particular, the content of the first message of the first type also comprises at least a part of the header of the first message of the first type cnt(hd(mssg$^{t1}$)), that is to say the recipient of the message hd_rcp, and/or the sender of the message hd_snd and/or the object of the message hd_obj.

FIG. 5c illustrates an integration of the content of a first message of a first type distinct from the second type in the form of a file of the first message of the first type according to the invention.

In the case where the integration is done by insertion of a file of the first message F_JN as illustrated by FIG. 1, the body of the second message of the second type cp(mssg$^{t2}$) comprises, following the integration CNT_INT$^{t2}$, a file containing the first message of the first type mssg$^{t1}$_img that can be read by a messaging device of the first type.

The file of the first message of the first type comprises notably the content of the first message of the first type, in particular the body of the content, that can be read by a messaging device of the first type. The content of the body is understood to mean at least the text of the body of this first message of the first type, and possibly the image(s), spreadsheet(s), chart(s), etc. included in the body of this first message of the first type cp(mssg$^{t1}$), as appropriate.

In particular, the content of the first message of the first type also comprises at least a part of the header of the first message of the first type cnt(hd(mssg$^{t1}$)), that is to say the recipient of the message hd_rcp, and/or the sender of the message hd_snd and/or the object of the message hd_obj.

Thus, the recipient of the second message, if he or she has a messaging device of the first type, will be able to read the content of this first message by extracting the file from the second message and by importing it into his or her messaging device of the first type even if he or she does not have access to the network for receiving messages of the first type.

The invention also targets a medium. The information medium can be any entity or device capable of storing the program. For example, the medium can comprise a storage means, such as a ROM, for example a CD ROM or a microelectronic circuit ROM or even a magnetic storage means, for example a diskette or a hard disk.

Also, the information medium can be a transmissible medium such as an electrical or optical signal which can be routed via an electrical or optical cable, wirelessly or by other means. The program according to the invention can in particular be downloaded over a network, notably of Internet type.

Alternatively, the information medium can be an integrated circuit into which the program is incorporated, the circuit being adapted to execute or to be used in the execution of the method concerned.

In another implementation, the invention is implemented by means of software and/or hardware components. In this respect, the term module can correspond equally to a software component or to a hardware component. A software component corresponds to one or more computer programs, one or more subprograms of a program, or more generally to any element of a program or of software capable of implementing a function or a set of functions according to the above description. A hardware component corresponds to any element of a hardware assembly capable of implementing a function or a set of functions.

Alternatively, the information medium can be an integrated circuit into which the program is incorporated, the circuit being adapted to execute or to be used in the execution of the method concerned.

In another implementation, the invention is implemented by means of software and/or hardware components. In this respect, the term module can correspond equally to a software component or to a hardware component. A software component corresponds to one or more computer programs, one or more subprograms of a program, or, more generally, to any element of a program or of software capable of implementing a function or a set of functions according to the above description. A hardware component corresponds to any element of a hardware assembly capable of implementing a function or a set of functions.

The invention claimed is:

1. A sharing management method for managing sharing of a message of a first type through a communication network, the method comprising the following acts performed by a communication terminal:
    receiving a selection of a sharing command from an interface of the communication terminal for reproducing the first message of the first type; and
    integrating content of the first message of the first type into a second message of a second type to be transmitted through the communication network, the second type being distinct from the first type,
    wherein the integrating comprises pasting text of the content of the first message into a body of the second message, which is triggered by the receiving of the selection.

2. The sharing management method as claimed in claim 1, wherein the sharing management method comprises opening an interface for inputting the second message of the second type following the act of receiving of the selection of the sharing command from the interface for reproducing the first message of the first type and prior to the act of integrating.

3. The sharing management method as claimed in claim 1, wherein the integrating comprises inserting an image of the content of the first message, which is triggered by the act of selecting.

4. The sharing management method as claimed in claim 1, wherein the integrating comprises inserting a message file of the content of the first message, which is triggered by the act of selecting.

5. A method for sharing a message of a first type through a communication network, the method comprising the following acts performed by a communication terminal:
   receiving a selection of a sharing command from an interface of the terminal for reproducing the first message of the first type; and
   in response to receiving the selection of the sharing command, triggering an integration of content of the first message of the first type into a second message of a second type to be transmitted through the communication network, the second type being distinct from the first type,
   wherein the integration comprises pasting text of the content of the first message into a body of the second message.

6. The method for sharing as claimed in claim 5, wherein the sharing method further comprises determining an interface for inputting a message of the second type as a function of the selected sharing command.

7. A method for managing messages of a first type comprising the following acts performed by a communication terminal:
   reproducing a first message of the first type, and
   reproducing an interface for selecting a sharing command from an interface for reproducing the first message of the first type, the sharing command triggering an integration of content of the first message of the first type into a second message of a second type to be transmitted through the communication network, the second type being distinct from the first type,
   wherein the integration comprises pasting text of the content of the first message into a body of the second message.

8. A non-transitory computer-readable medium comprising a program stored thereon comprising program code instructions for executing a method for managing sharing of a message of a first type through a communication network, when said program is executed by a processor of a communication terminal, wherein the instructions configure the communication terminal to perform acts comprising:
   receiving a selection of a sharing command from an interface of the communication terminal for reproducing the first message of the first type; and
   integrating content of the first message of the first type into a second message of a second type to be transmitted through the communication network, the second type being distinct from the first type,
   wherein the integrating comprises pasting text of the content of the first message into a body of the second message, which is triggered by the receiving of the selection.

9. A communication terminal for distributing messages of a first type through a communication network, the communication terminal comprising:
   a processor; and
   a non-transitory computer-readable medium comprising instructions stored thereon which when executed by the processor configure the communication terminal to perform acts comprising:
      reproducing the first message of the first type on an interface;
      providing an interface for selecting a sharing command from the interface for reproducing the first message of the first type;
      receiving a selection of the sharing command, triggering integration of content of the first message of the first type into a second message of a second type to be transmitted through the communication network, the second type being distinct from the first type,
      wherein the integration comprises pasting text of the content of the first message into a body of the second message.

10. The communication terminal of claim 9, wherein the messages of the first type are of the electronic messaging type.

11. The communication terminal according to claim 9, wherein the second message of the second type is of one of the types out of the following:
   messaging for mobile short messages,
   messaging for mobile multimedia messages,
   messaging for IP short instant messages.

* * * * *